Dec. 27, 1938.  R. VARLEY  2,141,775
THERMOSTATIC DEVICE
Filed Sept. 18, 1935   4 Sheets-Sheet 1
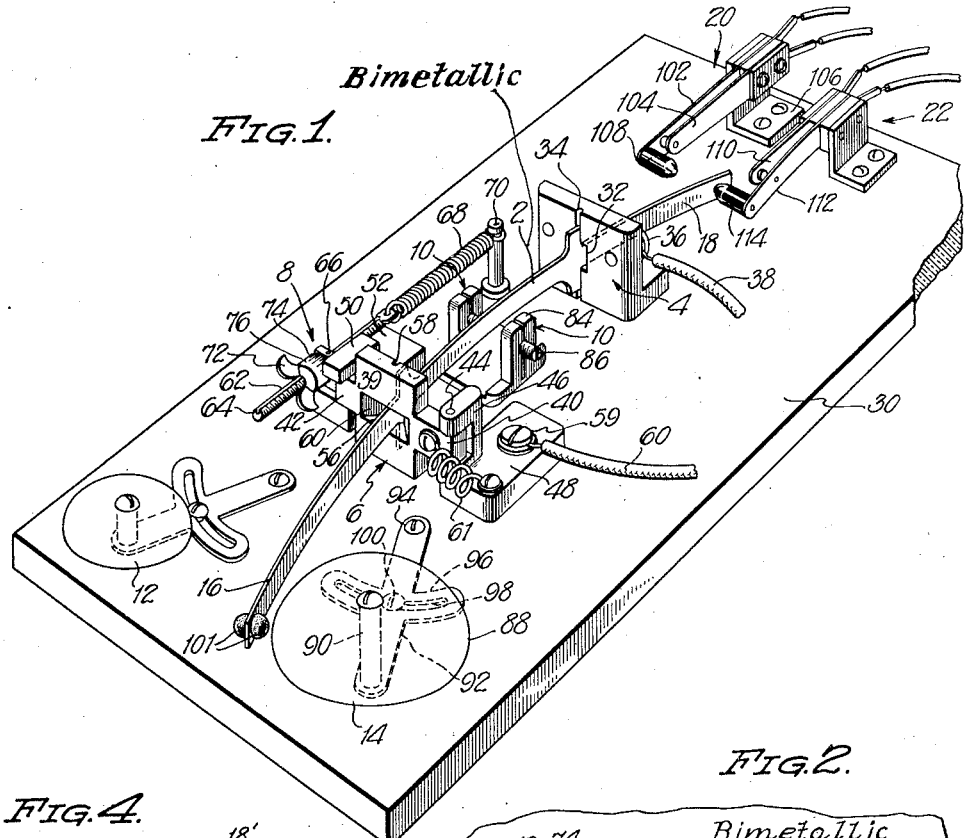
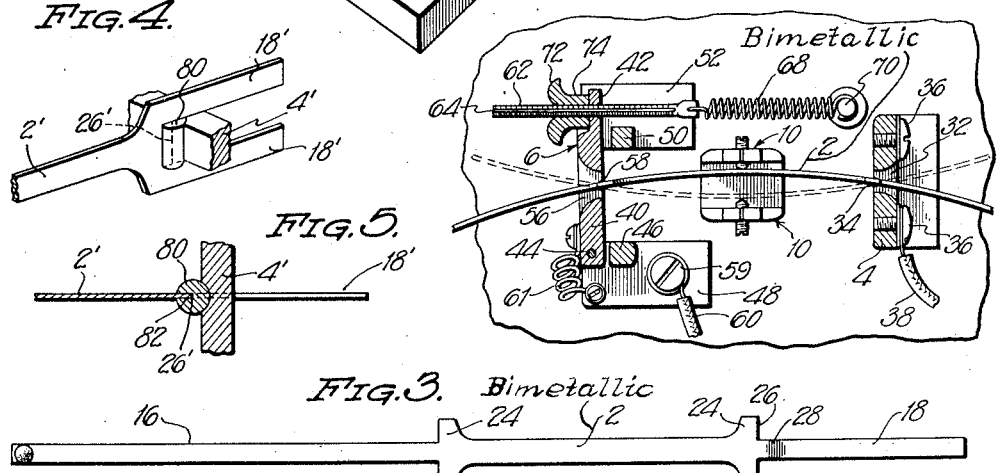
RICHARD VARLEY,
INVENTOR.
WITNESS:
ATTORNEYS.

Dec. 27, 1938.    R. VARLEY    2,141,775
THERMOSTATIC DEVICE
Filed Sept. 18, 1935    4 Sheets-Sheet 2

RICHARD VARLEY.
INVENTOR.

WITNESS:

ATTORNEYS.

Dec. 27, 1938.     R. VARLEY     2,141,775
THERMOSTATIC DEVICE
Filed Sept. 18, 1935     4 Sheets-Sheet 3
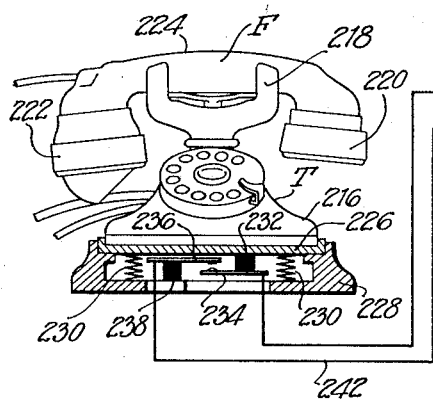
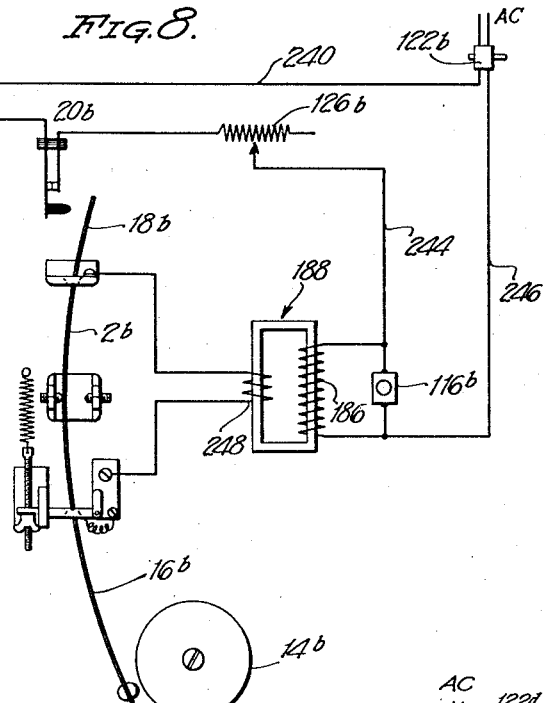
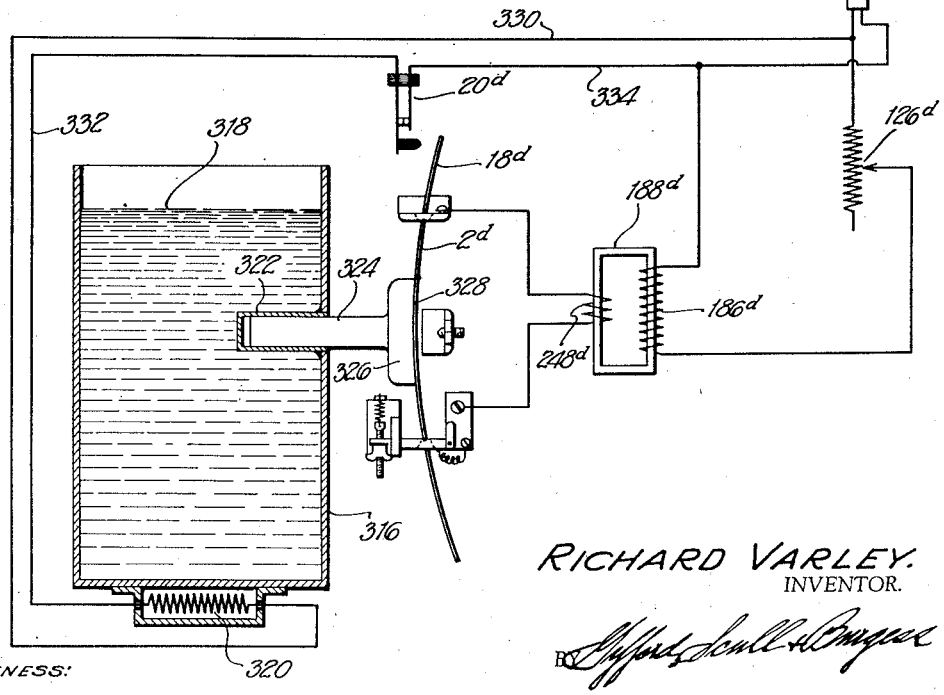
RICHARD VARLEY.
INVENTOR.

Dec. 27, 1938.   R. VARLEY   2,141,775
THERMOSTATIC DEVICE
Filed Sept. 18, 1935   4 Sheets-Sheet 4

RICHARD VARLEY.
INVENTOR.

WITNESS:

ATTORNEYS.

Patented Dec. 27, 1938

2,141,775

UNITED STATES PATENT OFFICE 2,141,775

THERMOSTATIC DEVICE

Richard Varley, St. George, Staten Island, N. Y., assignor, by mesne assignments, to Harry A. Richards, Stamford, Conn.

Application September 18, 1935, Serial No. 41,026

10 Claims. (Cl. 200—113)

My invention relates to thermostatic devices, and it has special reference to such devices that are responsive to changes in temperature for automatically actuating or controlling the operation of auxiliary apparatus or electrical circuit connections, such for example, as mechanical or electrical signals, bells, indicators or various classes of electrical equipment.

One of the objects of my present invention is to provide a thermostatic device of the above indicated character which shall be simple, inexpensive and regulatable in construction and operation, and particularly adapted to effect a positive and reliable actuation or operation of whatever type of auxiliary equipment it is intended to operate or control.

Another object of my invention is to provide a thermostatic device of the class indicated which shall be automatically responsive to temperature changes to which it is subjected and to abruptly and forcibly snap from its normal curvature or flexure to an opposite curved or flexed position and vice versa, and in conjunction therewith to provide for readily adjusting or regulating the operation thereof in such manner as to control the temperature and the time element of its operative movements to meet a wide range of operating conditions.

Another object of my invention is to provide an elongated thermostatic element having an intermediate portion thereof restrained to a controllable degree against longitudinal movement, and being capable of sudden or abrupt changes in form, contour or shape in response to varying temperature conditions, while utilizing one or both of its unrestrained integral or associated free ends, which are also adapted for corresponding sudden and abrupt actuation or movement, to strike, engage, control or actuate auxiliary apparatus disposed in the path or paths of movement of one or both of the respective freely and abruptly movable ends of the thermostatic element.

Another object of my invention is to provide such a thermostatic device in which an elongated bimetallic strip of thermostatic material is longitudinally restrained by freely movable edge-abutting engagements with spaced restraining members, and which may be heated, either solely or in conjunction with another source of heat, by electric current passing through that portion of the thermostatic strip which intervenes between the restraining members, while having at least one free end of said strip extending beyond one of said restraining members and adapted to actuate or control an auxiliary device during certain of the snap movements thereof.

A still further object of my invention is to make provision for regulatable, intermittent operation of such thermostatic devices and to effectively utilize such operation for controlling or manipulating the circuit connections of electrical devices and apparatus of various kinds; for instance, to automatically initiate the operation of a visible or audible signal a predetermined and considerable period of time after a telephone instrument has been removed from its supporting base for purposes of telephonic communication and thereafter to operate said signal at repeated relatively short time intervals until the telephone instrument is restored to its base after the telephone conversation has terminated.

These and other objects of the invention and features thereof by which the desired results are attained will be understood from the following description of the accompanying drawings, of which, Fig. 1 is a perspective view of a thermostatic device constructed and operated in accordance with my invention;

Fig. 2 is a fragmentary view, partially in section and partially in plan, of certain portions of the device shown in Fig. 1.

Fig. 3 is a plan view of the thermostatic element thereof.

Fig. 4 is a perspective view of a portion of a modified form of construction.

Fig. 5 is a sectional plan view of the apparatus shown in Fig. 4.

Fig. 8 is a diagrammatic view of the circuit connections of a control system embodying further modifications of my invention.

Fig. 10 is a diagrammatic view of circuit connections of a control system embodying further modifications of my invention.

Figure 6:
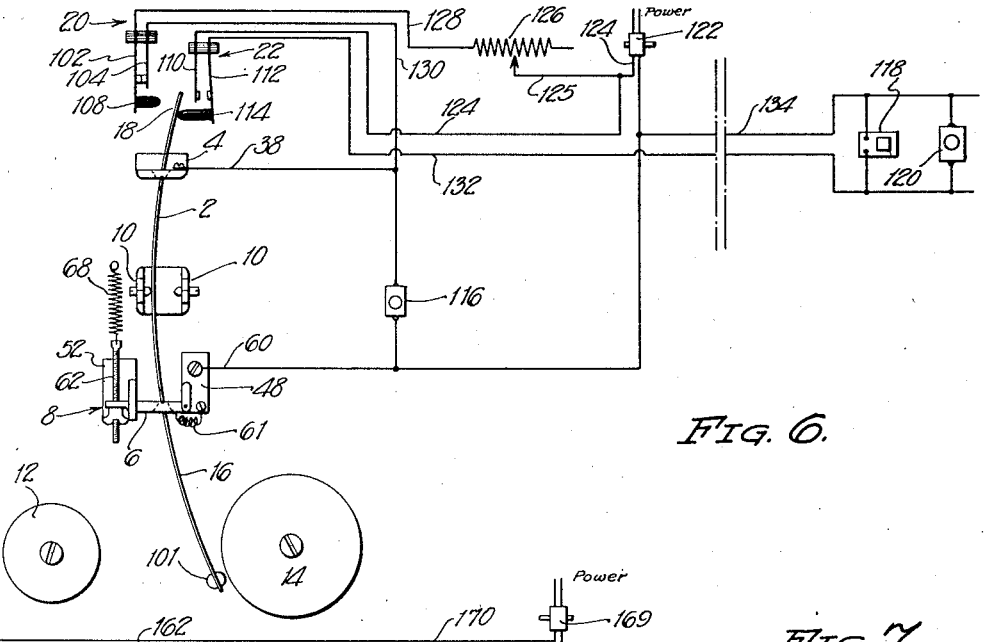
Fig. 6 is a diagrammatic view of the circuit connections of a control system embodying my invention.

Referring to the drawings, and particularly to Figs. 1, 2 and 3 thereof, which illustrate the structure of a device of typical or preferred form, the apparatus therein shown comprises an elongated thermostatic element 2 positioned between a fixed restraining or anchor member 4 and a pivotally mounted yieldable restraining member 6, in such manner that longitudinal restraint is imposed upon the thermostatic element, an adjustable yielding mechanism 8 for determining the degree of longitudinal restraint, a plurality of adjustable limit stops 10 for determining the lateral movement or curvature of the thermostatic element, a plurality of bells or gongs 12 and 14 adjustably mounted on the opposite sides of one freely extending end portion 16 of the thermostatic element and a plurailty of switches 20 and 22 disposed on the opposite sides of the other freely extending end portion 18 thereof.

The thermostatic element 2 comprises two strips of metal having dissimilar coefficients of thermal expansion such, for instance, as iron and brass, which strips are united to form a single unitary element, preferably by welding the two component parts together, although any mode of uniting these parts may be employed, such, for example, as brazing, or riveting. The thermostatic element 2 is preferably of the form indicated in Fig. 3 and is provided with spaced outwardly extending lugs or lateral extensions 24 projecting on opposite sides of the element to provide shoulders 26 for abutting or edge engagement with the respective restraining members 4 and 6.

The freely extending end portions 16 and 18 may, if desired, constitute integral parts of the bimetallic intervening portion 2 of the thermostatic element, but this is not essential, and the end portions 16 and 18 may comprise members of other material which are fixedly secured thereto, as by welding, as indicated at 28 in Fig. 3, or in any other suitable manner.

The fixed restraining member 4 is suitably secured to a base 30 of insulating material and projects upwardly therefrom, being provided with an aperture 32 therein through which the extended free end 18 of the thermostatic element projects with the shoulder edges 26 thereof disposed within a vertical slot 34 provided in the inner surface of the member 4. The aperture 32 is recessed or chamfered on the further side of the restraining member 4, as illustrated particularly in Fig. 2, in order to provide ample room for the free movements of the end 18 of the thermostatic element. The restraining member 4 is preferably made of copper or other material having high electric conductivity and is provided with screws 36 or other suitable means for attaching an electrical conductor 38, if so desired.

The restraining member 6 comprises a middle body portion 39 which is provided with laterally extending arms 40 and 42, the arm 40 being pivotally mounted upon a vertically disposed pin 44 which is carried by an upwardly projecting slotted lug 46 constituting a part of a base member 48 which is suitably secured to the main base 30. The other laterally extending arm 42 projects through a slotted opening in an upwardly projecting lug 50 forming a part of a base member 52 which is also suitably fixed to the main base 30. The outer end of this laterally projecting arm 42 is cooperatively associated with the adjusting yielding mechanism 8 which will presently be described.

The main body portion 39 of the pivotally mounted member 6 is provided with an aperture 56 through which the free end 16 of the thermostatic element projects and the inner face of this body portion 39 is provided with a vertically disposed slot 58, within which the edge of the shoulder 26 is disposed, has an edge-abutting engagement. In a similar manner to the fixed restraining member 4, the pivotally mounted restraining member 6 has its aperture 56 recessed or chamfered on the outer side, as shown in Fig. 2, to provide for free and unobstructed movements of the free end portion 16 of the thermostatic strip.

The restraining member 6 and the base member 48 are preferably made of copper or the like, and a screw 59, or other suitable means, is provided for fastening an electrical conductor 60 thereto, if so desired. Another electric conductor 61 is screwed or otherwise attached to the base member 48 and to the pivotally mounted restraining member 6 in order to provide for the passage of electric current, if so desired.

The adjusting mechanism 8, which is associated with the free end of the arm 42, which comprises an integral portion of the pivotally mounted restraining member 6, embodies a threaded rod 62 which extends through an opening therein and is provided with a keyway 64 for cooperative engagement with a pin or key 66 in order to permit the rod 62 to be moved longitudinally with respect to the arm 42, but to prevent rotation thereof. One end of the threaded rod 62 is attached to one end of a coil spring 68 which is disposed in alignment therewith, and the other end of the spring is secured to the upper end of a stationary post or pin 70 which is fixedly mounted upon the base member 30. The free end of the threaded rod 62 is provided with a wing nut 72, or the like, having a cylindrical body portion 74 upon which scale or calibration marks 76 (Fig. 1) are provided, as shown in Fig. 1.

Before proceeding further with a description of my thermostatic device and various novel adaptations or applications thereof to different fields of service, it is pointed out that the effective portion of the bimetallic thermostatic element 2 is that intervening between the restraining members 4 and 6, and this portion may comprise any two metals having sufficiently different coefficients of thermal expansion to produce the desired results. Moreover, the invention is not restricted to the particular form of thermostatic element illustrated in Fig. 1 and many modifications thereof may be utilized.

An example of such a modification is shown in Figs. 4 and 5, in which the thermostatic element 2' is provided with bifurcated end portions 18' which may be either integral with the thermostatic element or may constitute pieces of different material welded or otherwise secured thereto. These bifurcated end portions 18' are spaced apart a sufficient distance to straddle a bar 4' which performs the general function of the restraining member 4 in Fig. 1. The restraining bar 4' may be slotted to receive an edge or shoulder portion 26' in the same manner as the structure in Fig. 1, although in some instances it may be desirable to provide a semi-cylindrical recess in the bar 4' to receive a portion of a cylindrical roller or bearing member 80 which is provided with a radial slot 82 in order that it may be forced tightly upon the shoulder portion 26' of the thermostatic element 2'. With this type of construction, a considerable bearing surface is provided with the restraining member 4', which facilitates the passage of electric current between the member 4' and the thermostatic element 2' under such conditions of use as require the thermostatic element to be heated directly by electric current.

Of course, the restraining member 4 and thermostatic element 2 of the construction shown in Fig. 1 may also be adapted for the use of similar cylindrical bearing members, if desired, in which case the bearing members will be fitted over the shoulder portion 26 of the thermostatic element and be received in suitable semi-cylindrical recesses in the restraining member 4, as will be understood.

In any event, regardless of the shape or manner of mounting of the thermostatic element, the effective or intervening portion thereof will assume a normal or natural curvature in one direction by reason of the different thermal characteristics of expansion and contraction of the two component parts thereof. Moreover, the effective intermediate portion thereof will be placed under a controllable degree of longitudinal restraint by means of the restraining members 4 and 6. The character and amount of such restraint is determined by the manipulation of the adjustable yielding mechanism 8 by means of which more or less yielding pressure is placed upon the pivotally mounted yielding restraining member 6. By the same means a certain amount of edge-abutting pressure is effected between the shoulder portions 26 of the thermostatic element and the respective restraining members 4 and 6, whereby a satisfactory electrical connection is secured between said parts to enable the passage of electric current through the thermostatic element, if so desired.

Although I prefer in many cases to actually pass electric current through the thermostatic element, the invention in its broader aspects is independent of such application, and the thermostatic element may respond to changes in temperature from any source of heat, whether generated electrically within the thermostatic element itself, or produced by heating means adjacent thereto, or at a point more or less remote therefrom.

Assuming therefore that the intermediate or effective portion of the thermostatic element 2 is subjected to heat from some source which, for present purposes, need not be identified, the operation of the thermostatic element will respond to the variations in temperature to which it is subjected. By reason of the dissimilar coefficients of thermal expansion of the component parts thereof, internal stresses will be developed therein and the thermostatic element, responding thereto, will tend to flatten or straighten out from its normal position of curvature. This tendency will be resisted by the restraining members 4 and 6 until at some predetermined temperature, for which the device may be preliminarily adjusted, the internal stresses will develop to a point of instability, whereupon the stresses will be relieved and the thermostatic element 2 will abruptly snap into a position of opposite curvature, as indicated in the dotted lines in Fig. 2, whereby the normal configuration or flexure of the thermostatic element is suddenly reversed. While this actual reversal of curvature is effected forcibly and abruptly, the preliminary changes in the thermostatic element to the point of instability are relatively slow and gradual. The reversal of form, however, is always abrupt and forcible, and dependent upon the mass of the thermostatic element and one or more operating conditions which are capable of manual adjustment, as will later become apparent.

Coincident with the abrupt reversal of curvature of the intermediate restrained portion of the thermostatic element 2, the respective free ends 16 and 18 thereof are subject to corresponding abrupt and forcible movements. According to my invention, I make use of the snap movements of the free ends of the thermostatic element to operate or control various types of auxiliary devices such, for example, as the bells or gongs 12 and 14 and the auxiliary control switches 20 and 22, illustrated in Fig. 1 of the drawings.

Having effected the reversal of configuration of the thermostatic element 2 at a predetermined temperature, as already explained, the thermostatic element remains in its reversal position of curvature until it has been permitted to cool to some other determinable lower temperature. During this cooling period, the contraction of the component parts of the element being unequal, by reason of the different thermal properties thereof, corresponding unequal internal stresses will be developed therein and the thermostatic element will slowly tend to resume its normal position of curvature, until such time as the resultant internal stresses develop a condition of stability. Thereupon, the thermostatic element 2 will abruptly and forcibly snap back to its normal position of curvature. This snapping movement will, of course, be accompanied by corresponding whipping or abrupt movements of the respective ends 16 and 18 thereof, which movements are utilized for accomplishing useful purposes, as will later appear.

The time periods of the snap movements of the thermostatic element 2 depend primarily upon the changes in temperature thereof. However, these time periods are also dependent upon various other conditions of operation, some of which are controllable and manually adjustable. For instance, the mass of the thermostatic element and the extent to which it may be enveloped and enclosed, and its rate of heat radiation thereby determined, are examples of operating conditions which affect the time periods, but which ordinarily can not be readily varied at will. On the other hand, the degree of longitudinal restraint imposed upon the thermostatic element is a factor which can be controlled with facility through the adjusting mechanism 8. Moreover, if an electric current is passed directly through the thermostatic element, the amperage thereof may be regulated with ease by means of suitable adjustable rheostats or by suitably changing the connections of an electrical transformer that may be conveniently employed in the system.

Another adjustment by means of which the operation of the device may be controlled and the time periods thereof varied, lies in the limit stops 10 which have previously been referred to. These limit stops 10 are alike and are positioned on the opposite sides of the thermostatic element 2 substantially midway between the respective end restraining members 4 and 6. Each limit stop comprises an upwardly projecting lug or member 84 which is suitably fixed to the main base 30 and which carries a threaded and adjustable screw member 86. These screw members 86 may be adjusted to position their inner ends so as to be contacted with the thermostatic element with any desired degrees of pressure when the thermostatic element occupies either of its flexed or curved positions. The use of these limit stops, not only limits and determines the amplitude of movement of the thermostatic element, but also affects to a controllable degree the amount of longitudinal pressure or restraint to which the intermediate effective portion of the thermostatic element is subjected. The limit stops 10 furthermore tend to emphasize and accentuate the shipping movements of the free ends 16 and 18 of the element 2.

Having obtained a general understanding of the structure and operating functions of some of the main portions of the thermostatic device, the structure of the auxiliary bells 12 and 14 and the control switches 20 and 22, and the manner of actuation thereof, will be described.

The bells 12 and 14 may be of any form and shape, but, as shown for illustrative purposes, are similar except for size which merely affects the tone thereof. Each bell comprises a bell-shaped gong 88 which is suitably mounted upon an upright post 90 that is carried at the outer end of a supporting strip or member 92 which is pivotally mounted at its inner end upon a screw 94 or other suitable means. The supporting member 92 also embodies a transverse portion 96 which is provided with an arcuate slot 98 through which a screw 100 projects and by means of which the position of the bell, with respect to striking hammer or button 101 at the outer end of the end portion 16 of the thermostatic element, may be adjusted, as desired.

The auxiliary switches 20 and 22 are mounted on the base 30 in any suitable manner on opposite sides of the free end portion 18 of the thermostatic element 2, so as to be engaged and actuated thereby during its respective snap movements. The switch 20 comprises two spring contacts 102 and 104 which are mounted in spaced relation and insulated from one another upon a supporting lug 106. The spring contact 102 extends somewhat beyond spring contact 104 and is provided with an insulating button or finger 108 which is adapted to be engaged by the free end portion 18 during its movement in one direction. Normally, the spring contacts 102 and 104 are in electrical engagement, but when the free end 18 of the thermostatic element 2 is brought into contact with the insulating button 108, the spring contact 102 is forced backwardly to suddenly break the electrical engagement.

The control switch 22 is similar in general construction to that just described, and its respective spring contacts 110 and 112 are normally held in disengaged position by the normal position of the free end 18 of the thermostatic element 2, which end engages an insulating button 114 which is mounted upon the longer spring contact 112.

With the thermostatic element 2 in its normal position, as shown in Fig. 1, the control switch 22 is held in open position, while control switch 20 occupies a normal closed position. As the thermostatic element 2 is raised in temperature and eventually abruptly snaps to its opposite position of curvature, the free end 18 thereof disengages the insulating button 114 and permits control switch 22 to assume its normal closed position. Immediately following this action, the free end 18 engages the insulating button 108 of control switch 20 and effects the electrical disengagement of its normally closed spring contacts.

Having set forth the general construction and operation of my thermostatic device per se, I will now describe certain representative applications of its use in various control systems constituting part of my invention.

Referring particularly to Fig. 6 of the drawings, the thermostatic device, as previously described, is shown diagrammatically in connection with an electrical system by means of which electric current is passed directly through the thermostatic element 2, which is arranged to intermittently operate or strike the bells or gongs 12 and 14 and to intermittently flash or operate a signal lamp 116, while at the same time controlling the intermittent operation of other remotely located auxiliary electrical apparatus or devices, such as a buzzer 118 and a lamp 120.

Assuming the thermostatic element 2 to occupy its normal position of curvature in engagement with one of the limit stops 10, as shown, and that a power switch 122 be operated to connect the system to a source of power, marked Power, a circuit is established from one side of the source of power through the switch 122, conductor 124, conductor 125, variable rheostat 126, conductor 128, spring contacts 102 and 104 of control switch 20, conductor 130, where the circuit divides, one branch including conductor 38, restraining member 4, thermostatic element 2, restraining member 6, conductor 61, base member 48, and conductor 60 and thence through the power switch 122 to the other side of the source of power, while the other branch included the signal lamp 116 and then joins conductor 60.

By preliminarily regulating the rheostat 126, any desired amount of heating current may be passed through the thermostatic element 2. As this element becomes gradually heated and internal stresses are developed therein, it has a tendency to slowly straighten out in opposition to the longitudinal restraint imposed thereon by the adjustable spring 68. When a substantially predetermined temperature is reached, the developed stresses render the thermostatic element 2 unstable and an abrupt snap movement thereof is effected to its opposite position of curvature against the oppositely disposed limit stop 10. This sudden movement produces corresponding snap or whipping movements in the respective end portions 16 and 18 thereof. The end portion 16, which carries the striking button or hammer 101, strikes the gong 12, while the freely movable end portion 18 engages the insulating button 108 of control switch 20 and thereby disengages the spring contacts 102 and 104 thereof. Thus, the heating circuit through the thermostatic element 2 is interrupted and said element begins to cool.

At the time the free end 18 is actuated, it disengages the button 114 of the auxiliary switch 22 and permits its cooperating spring contacts 110 and 112 to effect electrical engagement. This action establishes an operating circuit for the remotely located auxiliary electrical devices 118 and 120. This circuit, starting from the power switch 122, includes conductor 124, spring contacts 110 and 112 of control switch 22, conductor 132 and thence through buzzer 118 and lamp 120 in parallel to conductor 134 and the power switch 122. Thereupon the devices 118 and 120 are thrown into operation.

As the cooling of the thermostatic element 2 takes place it gradually recedes from its engaged limit stop 10 until a condition of instability is created by the internal stresses developed therein, whereupon it abruptly reverses its curvature and forcibly snaps into its original normal position of flexure against the opposite limit stop 10.

During this movement the free end 16 of the thermostatic element 2 is suddenly actuated to cause the hammer or button 101 to strike the gong 14 and, at the same time, the other end portion 18 suddenly moves away from the insulating button 108, thereby permitting the cooperating spring contacts of control switch 20 to be brought into electrical engagement, thus restoring the passage of electric current through the thermostatic element 2. When the free end 18 engages the insulating button 114, the cooperating spring contacts of auxiliary switch 22 are disengaged, and the operation of the remotely located electrical devices 118 and 120 is interrupted.

The electric current having again been supplied to the thermostatic element 2, the cycle of operations is repeated as before, except that as the element 2 has been previously heated, it will reach its operating temperature in a shorter period of time. Thus, the operation continues intermittently, as the thermostatic element 2 responds to varying temperature conditions. In so doing, the gongs or bells 12 and 14 are alternately sounded and the control switches 20 and 22 alternately actuated, while the signal lamp 116, as well as the remotely located electrical devices 118 and 120 are operated intermittently.

The temperatures at which the respective snap movements of the thermostatic element 2 are effected may be controlled and predetermined by suitable regulation or setting of the rheostat 126, the adjusting mechanism 8 and the position of the limit stops 10, or by a combination of any two or more of such adjustments. Moreover, by a proper corelation of such adjustments, the time period of such snap movements of the thermostatic element may be determined and regulated within a considerable range of time, for instance from a few seconds to several minutes, although the actual movements thereof will be abrupt, positive and forcible.

Figure 7:
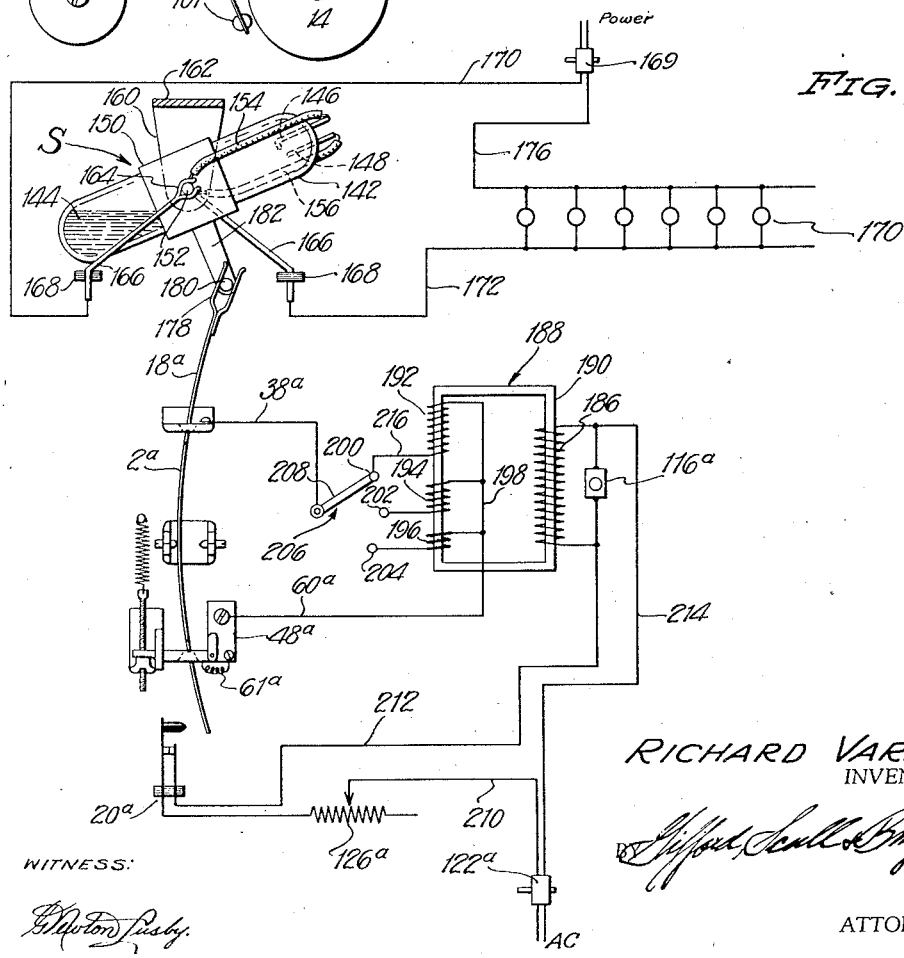
Fig. 7 is a diagrammatic view of the circuit connections of another modified control system embodying my invention.

Referring now to Fig. 7 of the drawings, another adaptation of my invention is illustrated and is particularly arranged to effect the intermittent operation of a mercury switch S through the agency of a thermostatic control device of the type hereinbefore described.

The mercury switch S may be of any well-known construction, but preferably it embodies a glass bulb or container 142 containing a pool of mercury 144 and is provided at one end with a plurality of spaced contact members or electrodes 146 and 148. This glass container 142 is mounted at its mid-section within a surrounding supporting member 150 which may conveniently be formed of molded material, if so desired, and which is cemented or otherwise suitably secured thereto. This supporting member 150 is provided with a pair of outwardly projecting shafts or trunnions 152 extending on opposite sides thereof, and preferably made of copper or other electrical conducting material. The electrode 146 is electrically connected to one of the trunnions 152 by means of a conductor 154, while the other electrode 148 is similarly connected to the other trunnion by condutcor 156.

The respective trunnions serve as pivotal supports for the mercury switch and are carried by downwardly projecting lugs 160 of a U-shaped supporting bracket 162 which may be secured to any suitable supporting structure (not shown). The outer ends of the respective trunnions 152 have electrical engagement with brushes 164 which partially surround the trunnions and have a yielding and sliding engagement therewith.

These brushes 164 comprise the upper ends of a pair of conducting arms 166 which are suitably supported by blocks of insulating material 168 and are adapted to be connected to any desired electrical circuit, the operation of which is to be controlled. As illustrated, this circuit includes a power switch 169, a bank of electric lamps 170, such as used in electric signs, which are adapted to be connected in parallel across a source of power marked Power by means of the mercury switch S.

The mercury switch S by reason of its construction and mode of mounting, is adapted to be rotated back and forth to an operative and an inoperative position. In the drawings, the switch is shown in its normal inoperative position, the two electrodes 146 and 148 being entirely out of contact with the pool of mercury 144, whereby the circuit through the bank of lamps 170 is interrupted. However, when the switch is rotated to its other or operative position, the electrode end thereof occupies a lowered position, while the opposite end is correspondingly raised, whereby the pool of mercury 144 is permitted to flow by gravity to the lower end to thus complete the circuit between the electrodes. This circuit is from one side of the source of power through power switch 169, conductor 170, conducting arm 166 and associated brush 164, trunnion 152, conductor 154, electrode 146, pool of mercury 144, electrode 148, conductor 156, trunnion 152, brush 164 and conducting arm 166 on the further side of the switch, conductor 172 and thence in parallel through the bank of lamps 170, conductor 176 and switch 169 to the other side of the source of power.

The actuation of the mercury switch S into the one or the other of its positions is effected by means of a thermostatic control device of the type hereinbefore described, in which a thermostatic element 2ᵃ is provided with a freely movable end portion 18ᵃ which is provided with a bifurcated end portion 178 having a sliding engagement with a pin 180 carried at the lower end of an arm 182 which is secured to or integral with the mercury switch supporting member 150.

Through the agency of this mechanical connection between the free end 18ᵃ of the thermostatic element 2ᵃ and the switch supporting member 150, it is evident that the abrupt or snap movements of the thermostatic element, in response to changes in temperature, will effect the actuation of the mercury switch S alternately from its normal inoperative position to its operative position, whereby the bank of lamps 170 is intermittently connected to the source of power and thus repeatedly flashed.

While the general construction and operation of the thermostatic device is similar to that already described, the electric current passing therethrough by means of which it is heated, is derived through a somewhat different arrangement of circuit connections. For instance, the source of power, marked AC, is connected by a manually operable switch 122ᵃ through an adjustable rheostat 126ᵃ, and a normally closed control switch 20ᵃ to a primary winding 186 of an electrical transformer 188 having a magnetic core 190. The transformer is also provided with a plurality of independent secondary windings 192, 194 and 196 having different numbers of turns and comprising different sizes of conductors. For instance, secondary winding 192 has the largest number of turns of the smallest size conductor. Secondary winding 196 has the smallest number of turns of the largest size conductor, and secondary winding 194 has an intermediate number of turns of an intermediate size conductor.

These secondary transformer windings are connected at one end to a common conductor 198 and the other ends thereof are respectively connected to stationary contacts 200, 202 and 204 of a control switch 206 having a pivotally mounted switch arm 208 by means of which any of the secondary windings may be utilized as desired, whereby the voltage impressed across the effective or intervening portion of the thermostatic element 2ᵃ, and therefore the amperage of the current passing therethrough, may be varied or adjusted to suit the conditions of operation. For example, if a relatively small amount of current is required through the thermostatic element 2ᵃ, the switch arm 208 of the control switch 206 is placed in the position shown in the drawings, in which secondary winding 192 of the transformer is connected in circuit.

Assuming that it is desired to start the system into operation, switch 122ᵃ is closed, thereby completing a circuit from one side of the source of power AC through conductor 210, adjustable rheostat 126ᵃ, control switch 20ᵃ, conductor 212, transformer primary winding 186, and conductor 214 to the other side of the source of power. Having thus energized the transformer 188, power is induced in the secondary winding 192 and electric current passes through the thermostatic element 2ᵃ by means of a circuit including conductor 216, contact 200, switch arm 208, conductor 38ᵃ, thermostatic element 2ᵃ, conductor 61ᵃ, base member 48ᵃ, conductor 60ᵃ, and conductor 198 to the other side of the primary winding 192.

For the purpose of effecting intermittent signals in accordance with the operation of the thermostatic control device, a lamp 116ᵃ may be connected across the transformer primary winding 186.

Without further description, it will be understood that the thermostatic control device may be adjusted in any of the various manners hereinbefore referred to, and including the selective operation of any one of the transformer secondary windings, in order to respond to any predetermined temperature conditions of the thermostatic element 2ᵃ. Moreover, by effecting suitable corelated adjustments, the time interval of operation of the respective snap movements of the thermostatic device may be controlled as desired. In this way, the operation of the mercury switch S, and therefore of the bank of lamps 170, may be so regulated as to produce any desired time interval of intermittent flashing of the lamps, and corresponding intermittent operation of the signal device 116ᵃ.

The method of rotatably mounting the mercury switch S and the disposition of the conductors 154 and 156 which are connected to the respective electrodes thereof, is particularly adapted for use in connection with my thermostatic control device which, by reason of its abrupt snap movements, would crystallize and destroy any loose conductors to the switch electrodes, such as is common practice with many types of mercury switches.

In Fig. 8 of the drawings another useful application of my thermostatic control device is shown in connection with means for intermittently flashing a signal to the user of an ordinary telephone set, such as that shown in this figure and denoted by the letter T. This telephone set T comprises a base 216 which is provided with a supporting cradle 218 and a French type of telephone instrument F having a receiver 220 and a transmitter 222 fixedly disposed in spaced relation at the respective ends of a hand grip 224.

The telephone set T normally rests upon a floating platform 226 which is carried by a sub-base 228 and is supported upon springs 230. Secured to the bottom of the floating platform 226 by means of an insulating block 232 is a spring contact 234 and a cooperating spring contact 236 is mounted upon an insulating block 238 which is fixed to the sub-base 228. The spring contacts 234 and 236 are disposed in vertical alignment and are normally disengaged when the French telephone instrument F rests in its cradle 218. However, when the telephone instrument is picked up for use, the weight of the telephone set T is correspondingly decreased and the springs 230 are enabled to raise the floating platform 226 and thereby effect electrical engagement between the spring contacts 234 and 236.

In this manner, a circuit is established, provided switch 122ᵇ has been operated, from one side of the source of power through said switch, conductor 240, spring contacts 234 and 236, conductor 242, control switch 20ᵇ, adjustable rheostat 126ᵇ, and conductor 244, where the circuit divides, one branch including transformer primary winding 186, and the other branch including a signal device, such as lamp 116ᵇ, beyond which the branches join and pass through conductor 246 and switch 122ᵇ to the other side of the source of power.

The completion of this circuit upon the removal of the telephone instrument F from its cradle immediately energizes the transformer 188 and also operates the signal device 116ᵇ. The transformer 188 is also provided with a secondary winding 248 which is connected across the thermostatic element 2ᵇ of the thermostatic control device.

Without further description, it will be understood that the thermostatic control device operates intermittently to effect alternate reversals of its curvature and corresponding snap movements of the respective end portions 18ᵇ and 16ᵇ of the thermostatic element 2ᵇ, during which the energizing circuit of the transformer primary winding 186 and also of the signal device 116ᵇ is intermittently opened and closed by means of the control switch 20ᵇ during the successive time cycles of the operation in the manner previously set forth. The other free end portion 16ᵇ of the thermostatic element 2ᵇ cooperatively engages and strikes a gong or bell 14ᵇ on each alternate snap movement thereof.

By suitably regulating one or more of the various means for adjusting the operation of the thermostatic control device, the time intervals of the snap movements thereof may be varied and controlled, as desired, whereby the flashing cycle of the signal lamp 116ᵇ may be correspondingly controlled.

Of course, when the telephone conversation is terminated and the telephone instrument F restored to its cradle 218, the weight of the combined telephone set T is sufficient to depress the springs 230 and effect the disengagement of the spring contacts 234 and 236, whereby the supply of energy to the thermostatic control device is cut off.

The use of my thermostatic control device for the purpose of effecting intermittent signals to the user of a telephone is advantageous in warning the user to restore the telephone instrument to its cradle after the conversation has been completed, and is especially beneficial to the telephone company in promptly restoring its system to general use which is frequently disturbed for long periods of time through the neglect of the user in restoring the telephone instrument to its cradle.

Not only is this intermittent operation of a signal desirable, but, by reason of the various adjustments that may be effected in the operation of my thermostatic control device, it is possible to so adapt and arrange its operation that a considerable period of time, for instance, 2 minutes, may elapse after the telephone instrument is removed from the cradle for use before the thermostatic element is heated up to a temperature of operation and the first signal is effected. This time interval, or whatever time interval for which the device may be adjusted, is chosen with general reference to the normal length of time of telephone conversations in the locality or district where the device is installed, and is sufficient to enable the completion of a telephone conversation of representative or average length. Thus, the user is not subject to the annoyance of a signal during ordinary telephone calls. However, at the end of whatever time interval for which the thermostatic control device is adjusted, the first signal is given either audibly or by the flashing of a signal light, and thereafter it is repeated at relatively short time periods to which the device is preliminarily adjusted. Such intermittent signals, therefore, will be continuously repeated until the user has restored the telephone instrument to its cradle, and moreover will have a tendency to cause the user to curtail the length of his call.

Figure 9:
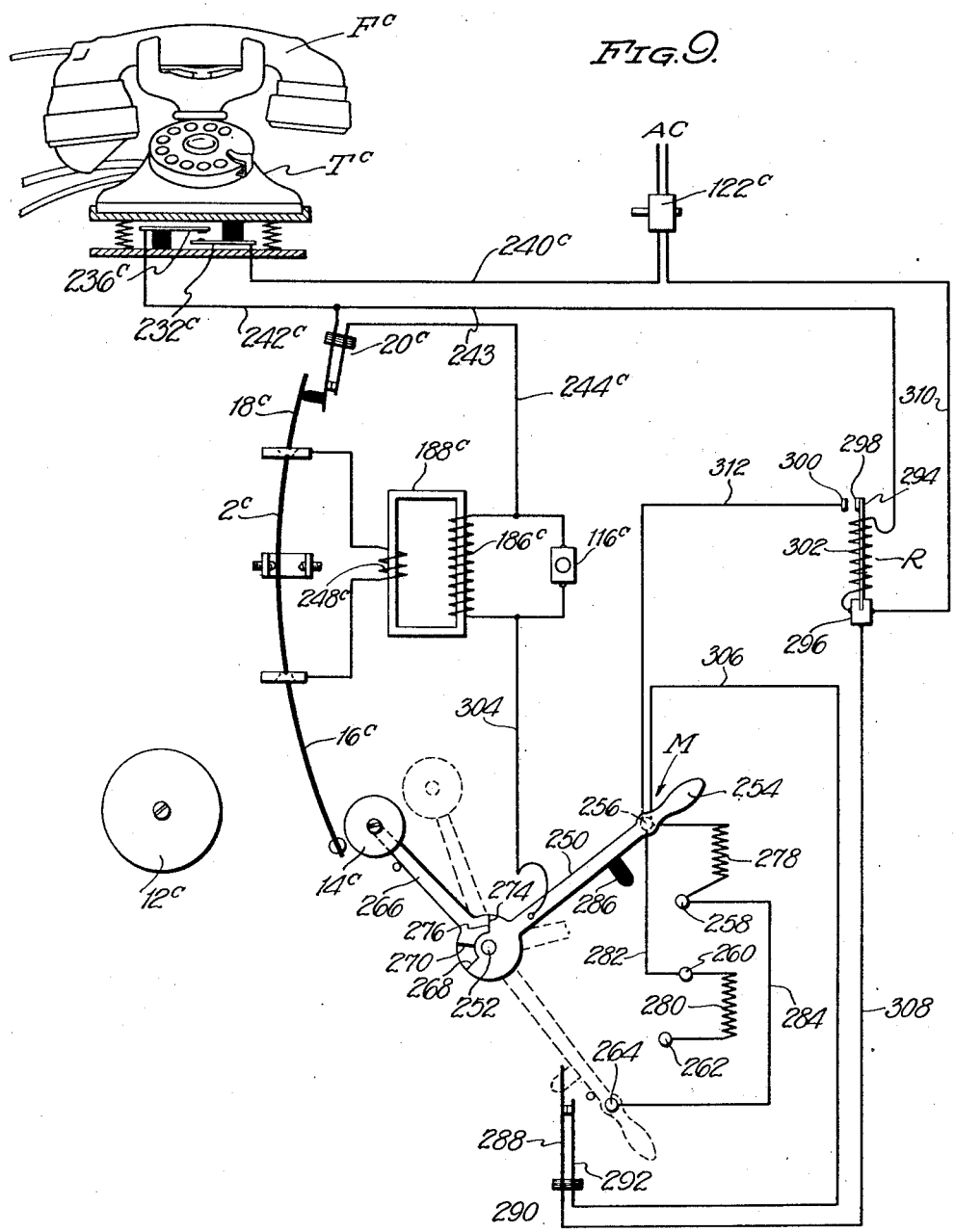
Fig. 9 is a diagrammatic view of the circuit connections of a control system embodying still further modifications of my invention.

In Fig. 9 of the drawings another somewhat more elaborate application of my thermostatic control device is shown for the purpose of effecting intermittent signals after a telephone instrument has been removed from its cradle, and this system, while being generally similar to that of Fig. 8, embodies a manually operable selective switch M for readily adjusting the character of operation, and an auxiliary thermostatic relay switch R for effecting a delay in the initial operation of the signalling devices.

In this figure, the automatic control mechanism associated with the sub-base upon which the telephone instrument T$^c$ rests, is illustrated diagrammatically, although structurally it is like that shown in Fig. 8. Moreover, instead of a single bell or gong in the path of movement of the lower free end 16$^c$ of a thermostatic element 2$^c$, a plurality of gongs or bells 14$^c$ and 12$^c$ are employed, and normally adapted to be struck by the end member 16$^c$ during its opposite snap movements. These gongs are of different size in order to give two distinct tones or pitches.

The manually operable selective switch M comprises a movable switch arm 250 which is pivotally mounted upon a pin 252 and is provided with a handle 254 by means of which it may be moved into any of a plurality of positions in order to effect an electrical engagement with a plurality of stationary contacts 256, 258, 260, 262 and 264. Also pivotally mounted upon the pin 252 is a supporting arm 266, preferably of insulating material, upon the outer end of which the bell 14$^c$ is secured. The arrangement and structure of the switch arm 250 and the bell-supporting arm 266 is such that there is a certain amount of lost motion between them as the switch arm 250 is moved from its initial position, as shown in the drawings, to its second position in engagement with the contact 258. For this purpose the switch arm 250 is provided with a shoulder 268, while the supporting arm 266 has a shoulder 270.

As the switch arm 250 is moved from engagement with contact 256 to engagement with contact 258, the lost motion provided by the space intermediate the shoulders 268 and 270 permits the supporting arm 266 and the bell 14$^c$ carried thereby, to remain stationary in a position where it will be struck by the lower free end 16$^c$ of the thermostatic element 2$^c$. However, when the switch arm 250 is moved further into engagement with any of the other contacts 260, 262 and 264, the shoulder 268 engages the shoulder 270, and the bell 14$^c$ is moved in a clockwise direction out of the path of the striking movement of the free end 16$^c$.

In order to return the bell 14$^c$ to its normal operative position by moving the switch arm 250 back to its initial operating position, said switch arm is provided with another shoulder 274 which engages another shoulder 276 on the supporting arm 266 after a certain amount of lost motion, and thereafter moves the bell 14$^c$ in the counter-clockwise direction back to its initial position. The particular structure by means of which this lost motion is effected forms no part of my present invention and any suitable structure for accomplishing this purpose may be employed.

Between contacts 256 and 258 a resistance element 278 is electrically connected, while a similar resistance element 280 is connected between contacts 260 and 262. Moreover, contacts 256 and 260 are interconnected by a conductor 282, while contacts 258 and 264 are interconnected by a conductor 284.

The switch arm 250 is also provided with an insulating finger or button 286 which in the lowermost position of the switch arm 250, in which it engages contact 264, is brought into engagement with a spring contact 288 of a control switch 290 which also includes a cooperating spring contact 292 which normally is in electrical engagement with the spring contact 288. As the insulating button 286 engages the spring contact 288, it causes a disengagement of the cooperating spring contacts of the control switch 290 for a purpose to be later set forth.

The thermostatic relay switch R comprises a bimetallic thermostatic element 294, the lower end of which is secured to a fixed base or block 296 of conducting material, while the upper free end carries a contact 298 which is adapted to cooperate with a stationary contact 300 during the operation of the device. The bimetallic thermostatic element 294 is surrounded by a heating coil 302 which is also electrically connected to the fixed base or block 296 and which is traversed by electrical current in a manner to be described, by means of which it is gradually and slowly brought up to a sufficient temperature to cause it to move its contact 298 into electrical engagement with the stationary contact 300, as will be understood.

The structure and design of the thermostatic relay switch R is such that it requires a considerable period of time, for example, in the neighborhood of two minutes, for it to carry out its function of engaging the contact members 298 and 300. On the other hand, the thermostatic element 2$^c$ of my thermostatic control device is constructed and arranged, in this particular application of its use, to function at relatively short time intervals, for instance a matter of four or five seconds.

With this understanding of the structure and operation of some of the parts of the modified system shown in Fig. 9, a description of its circuit connections and operation will be set forth.

Assuming that the power switch 122ᶜ has been closed and that the telephone instrument Fᶜ is removed from its cradle for use, a circuit is established from one side of the source of energy marked AC through said switch, conductor 240ᶜ, spring contacts 232ᶜ and 236ᶜ associated with the telephone set Tᶜ, conductor 242ᶜ, control switch 20ᶜ, conductor 244ᶜ and thence in parallel through primary winding 186ᶜ of transformer 188ᶜ and the signal lamp 116ᶜ, conductor 304, switch arm 250, stationary contact 256, conductor 306, spring contacts 292 and 288 of control switch 290, conductor 308, fixed block 296, conductor 310 and power switch 122ᶜ to the other side of the source of energy.

The transformer 188ᶜ is thereby energized, and electrical current, induced in its secondary winding 248ᶜ, is passed through the thermostatic element 2ᶜ, which operates after a few seconds to reverse its normal curvature and effect a snap movement of its respective free ends 18ᶜ and 16ᶜ in the general manner previously described. As the free end 18ᶜ moves away from the control switch 20ᶜ, the cooperating spring contacts thereof disengage and open the circuit of the transformer primary winding 186ᶜ. At the same time, the free end 16ᶜ whips into its opposite position and strikes the bell 12ᶜ.

As soon as the thermostatic element 2ᶜ cools down to a predetermined temperature, which requires but a few seconds in this instance, a reversal of curvature will take place abruptly and the respective ends 16ᶜ and 18ᶜ will snap back to their original positions. In so doing the end 16ᶜ strikes the bell 14ᶜ, while the end 18ᶜ engages and closes the control switch 20ᶜ to again supply electrical energy to the transformer primary winding 186ᶜ. Thereupon, the cycle of operations previously described is repeated intermittently and at short intervals until the telephone instrument Fᶜ is restored to its cradle.

If it should be desired to secure a somewhat slower intermittent ringing of the bells 12ᶜ and 14ᶜ, the user by means of the operating handle 254 of the manually operable selective switch M, may move the switch arm 250 into its second position in which it engages stationary contact 258, whereby the resistance element 278 is cut into the circuit of the transformer primary winding 186ᶜ. Thus, the transformer energizing current is reduced and the heating current passing through the thermostatic element 2ᶜ is also decreased, whereby a longer time is required to heat the element up to a point of effecting a snap movement. In this way the time element of the bell signals is materially increased and the intermittent ringing thereof is rendered slower.

It should be understood that during the movement of the switch arm 250 to its position in engagement with the stationary contact 258, the lost motion previously referred to permits the supporting arm 266, with the bell 14ᶜ mounted thereon, to remain stationary while the shoulder 268 of the switch arm 250 rotates in a clockwise direction until it finally engages the shoulder 270 on the supporting member 266.

In some cases it may be found desirable by the user to employ but a single bell for signal purposes, in which event the switch arm 250, by means of its handle 254, may be moved to effect an electrical engagement with stationary contact 260 which, as previously described, is interconnected with contact 256 by means of conductor 282. In this position the resistance element 278 is eliminated from the circuit of the transformer primary winding but, by reason of the engagement of the shoulders 268 and 270, the supporting arm 266, and the bell 14ᶜ mounted thereon are rotated to the position shown in dotted lines in Fig. 9, where the bell is moved out of the path of movement of the free end 16ᶜ of the thermostatic element. Thus, only one bell 12ᶜ is capable of being sounded, and this only on alternate movements of the free end 16ᶜ. It will be noted that by reason of the fact that the resistance element 278 is removed from the energizing circuit, the thermostatic element 2ᶜ is restored to its initial condition of operation in which its actuations are relatively fast and its time interval a matter of but a few seconds. However, since one of the bells 14ᶜ has been rendered inoperative, the time period of the bell signals will be double that taking place when the selective switch M occupied its first position.

In order to decrease further the periodicity of the bell signals, the switch arm 250 of the selective switch M may be moved into engagement with the stationary contact 262, whereby the resistance element 280 is cut into circuit with the transformer primary winding 186ᶜ. This decreases the heating current passing through the thermostatic element 2ᶜ and, therefore, increases the time period necessary for the operation thereof.

Up to this point in the description of the operation of the system shown in Fig. 9, no mention has been made of the operation of the auxiliary thermostatic relay switch R, for the reason that its operation in no way affects the functioning of the system so far described. As a matter of fact, the heating winding 302 which surrounds the thermostatic element 294 of this relay switch is energized at the time that the telephone instrument Fᶜ is picked up, in view of the fact that it is connected across the source of energy at that time by reason of conductor 243 and conductor 310. It has already been indicated that this thermostatic element 294 is so arranged as to have a long time interval of operation, for instance two minutes. Therefore, at the end of such a period, the contacts 298 and 300 will be brought into electrical engagement, thus completing a circuit from the thermostatic element 294 which is electrically connected at its lower end to the fixed block 296, through conductor 312 to the stationary contact 256 of the selective switch M. This circuit, however, merely bridges the normally closed control switch 290 and, therefore, has no effect whatever on the operation of the system so far described.

While the invention of the system of Fig. 9 set forth up to this point has been described and is particularly useful in connection with the controllable operation of signal bells used in connection with a telephone instrument, its usefulness is not so limited, and it is of great advantage when used for various other purposes, such, for example, as electrically operated alarm clocks, in which case the auxiliary switch comprising spring contacts 232ᶜ and 236ᶜ may be replaced by a suitable switch on the alarm clock which may be set to close at any predetermined time.

That portion of the system of Fig. 9 now to be set forth is particularly useful in connection with telephone signals, although it may have other desirable applications.

In describing my invention as set forth in Fig. 8, a desirable feature has been explained in which my thermostatic control device may be adjusted for a long initial time period of operation in order to permit of the average length of telephone conversation without annoying interruptions, and thereafter to effect rapid intermittent signals until the telephone instrument is restored to its cradle. That portion of my invention illustrated in Fig. 9 and about to be described, is adapted particularly to accomplish such a preliminary delay in the operation of the signal bells and to thereafter effect a more rapid and intermittent operation thereof.

This result is secured when desired by moving the switch arm 250 of the selective switch M to its last operating position, in which it makes electrical engagement with the stationary contact 264, at which time the insulating finger 286 engages the extended end of spring contact 288 and opens the circuit through the control switch 290. By thus interrupting the energizing circuit of the transformer primary winding 186$^c$, the thermostatic relay switch R is thrown into effective operation. As the heating current passing through the winding 302 surrounding the thermostatic element 294 slowly raises the temperature of said element, the movable contact 298 thereof gradually approaches the stationary contact 300 until at the end of the predetermined time period, in this instance assumed to be two minutes, an electrical engagement is effected between said contacts. Thereupon, the energizing circuit for the transformer primary winding 186$^c$ is completed from switch arm 250 through stationary contact 264, conductor 284, stationary contact 258, resistance element 278, stationary contact 256, conductor 312, cooperating contacts 300 and 298 of the thermostatic relay switch R, thermostatic element 294 and fixed block 296 to the return conductor 310 which is connected to the power switch 122$^c$.

Thus, a sufficient delay in the operation of the signal bells is provided to enable an ordinary average length of telephone conversation to be completed before the signal bells begin to operate. However, after their operation is once initiated through the circuit just described, a decreased amount of energy is supplied to the transformer winding 186$^c$ by reason of the inclusion in the circuit of the resistance element 278, so that the heating current through the thermostatic element 2$^c$ is correspondingly reduced and the time of operation thereof accordingly lengthened. Therefore the intermittent operation of the bells 12$^c$ and 14$^c$ is not only delayed for a considerable period, but after being initiated proceeds intermittently at a moderate rate until the telephone instrument F$^c$ is restored to its cradle.

Referring now to Fig. 10 of the drawings, a still further application of my thermostatic control device is illustrated for automatically regulating the operation of a heating device employed for supplying heat to a vessel containing a body of material to be heated, such, for example, as an electrically heated glue pot, a sterilizing vessel, or the like, which requires the maintenance of a closely regulated constant temperature.

In the drawings, a vessel 316, which is adapted to contain a body 318 of material to be heated, is provided with an electric heating element 320 disposed in the base thereof or in any other suitable location with respect thereto. The vessel 316 has an opening in its side wall into which is suitably secured by welding, or in any other suitable manner, an open-ended cylindrical member or thimble 322 of heat-conducting material, said member 322 being placed in the opening in the vessel and projecting into the body 318 of material to be heated. Inserted into said thimble or member 322 is a cylindrical plug 324 of heat-conducting material which engages the inner walls of the member 322 with reasonable tightness so as to have an efficient heat-conducting engagement therewith. The outer end of the heat-conducting plug 324 is provided with an integral head 326 having its outer surface 328 disposed in close proximity to a thermostatic element 2$^d$ constituting a part of a thermostatic control device of the type hereinbefore disclosed. The outer surface of the head 326 of the heat-conducting member 324 preferably has a curvature substantially corresponding to the normal curvature of the thermostatic element 2$^d$, although this is not essential in all cases. The heat-conducting member 324 may also be constructed in any other suitable form which is capable of efficiently delivering heat from the body of material 318 to be heated to the thermostatic element 2$^d$, and thus render said element responsive in its operations to variations in temperature of the material to be heated. Without further description, it will be understood that the thermostatic control device embodying the thermostatic element 2$^d$ operates in the general manner already described and intermittently reverses its curvature or configurations as it is raised to a predetermined temperature and subsequently is permitted to cool to another predetermined temperature. These reversals in curvature are effected abruptly and produce corresponding abrupt snap movements of the end portion 18$^d$.

The automatic regulation of the electric heating device 320, or any other suitable heating device, is effected in the following manner, assuming that the power switch 122$^d$ has been closed to connect the heating device 320 to a source of power marked AC. The heating circuit thus established is from one side of the source of energy through power switch 122$^d$, conductor 330, electric heating device 320, conductor 332, spring contacts of control switch 20$^d$, conductor 334, and power switch 122$^d$ to the other side of the source of energy. By means of this circuit, electrical power is delivered to the heater 320 which functions in the usual manner to supply heat to the body 318 of material to be heated and contained within the vessel 316, whereby its temperature is gradually raised.

Of course, the changes in temperature of the material to be heated are communicated by conduction through the walls of the thimble member 322, the heat-conducting plug 324 and its head 326 to the bimetallic thermostatic element 2$^d$. When said element reaches a predetermined temperature for which it has been adjusted to operate, it abruptly snaps to its opposite position of curvature. In so doing, its free end 18$^d$ engages and effects a quick opening of the cooperating spring contacts of the control switch 20$^d$. The supply of electric power to the heating device 320 is thus interrupted and the continued heating of the material within the vessel 316 is arrested. When its temperature has decreased sufficiently to permit the thermostatic element 2$^d$ to reach a predetermined lower temperature, for which it has been preliminarily adjusted, an abrupt reversal of its curvature is effected, and the thermostatic element 2$^d$ snaps back to its original position of curvature in heat-conducting relation to the head 326 of the heat-conducting member 324. During this movement, the free end 18$^d$ moves away from the control switch 20$^d$ and permits the cooperating spring contacts thereof to again establish electrical engagement, whereby the heating circuit, previously recited, is re-established and the heating device 320 again thrown into operation.

In this manner the thermostatic control device continues to repeat its cycle of operations, and by intermittently controlling the operation of the heating device 320, maintains the body of material 318 within the vessel 316 at a substantially uniform and predetermined temperature, as will be understood.

While the operation of the heating device 320 may be satisfactorily controlled in the manner just described, it is sometimes desirable to arrange for a limited amount of auxiliary electric heating to be supplied to the thermostatic element 2$^d$, but the degree of such auxiliary heat is minor and insufficient of itself to cause the actuation of the thermostatic control device. In order to supply this auxiliary electrical heat, I employ a transformer 188$^d$ having a primary winding 186$^d$ and a secondary winding 248$^d$. The secondary winding 248$^d$ is connected across the effective or intervening portion of the thermostatic element 2$^d$, while the primary winding 186$^d$ is connected across the source of power AC through the switch 122$^d$ and an adjustable rheostat 126$^d$ in a manner which it is deemed unnecessary to describe further. Of course, the temperatures at which the thermostatic element 2$^d$ effects its respective snap movements and the time elements thereof are controllable by means of the various adjustments hereinbefore set forth.

Although my invention has been described and illustrated as embodying more or less specific details of construction, operation and location and arrangement of parts, it should be understood that many modifications therein may be made without departing from the spirit and scope of my invention, and, therefore, only such limitations should be imposed as are indicated in the appended claims.

I claim as my invention:

1. A thermostatic device comprising an elongated bimetallic element of thermostatic material adapted to be subjected to heat, means cooperatively engaging said element at two separated points to impose longitudinal restraint upon the intervening portion thereof, at least one of the ends of said element extending freely beyond its corresponding point of restraint, said thermostatic element having its intervening portion normally curved in one direction until it is heated to a predetermined temperature when it abruptly snaps into a position having an opposite curvature, in which position it remains until cooled to a predetermined lower temperature when it abruptly snaps back to its original position of curvature, and auxiliary means disposed in the path of movement of an extended free end of said thermostatic element and adapted to be engaged and actuated thereby during certain of its abrupt movements.

2. A thermostatic device comprising an elongated bimetallic element of thermostatic material adapted to be subjected to heat, means cooperatively engaging said element at two separated points to impose longitudinal restraint upon the intervening portion thereof, at least one of the ends of said element extending freely beyond its corresponding point of restraint, said thermostatic element having its intervening portion normally curved in one direction until it is heated to a predetermined temperature when it abruptly snaps into a position having an opposite curvature, in which position it remains until cooled to a predetermined lower temperature when it abruptly snaps back to its original position of curvature, auxiliary means disposed in the path of movement of an extended free end of said thermostatic element and adapted to be engaged and actuated thereby during certain of its abrupt movements and means for regulating the conditions of operation of said thermostatic element to vary the time intervals of the snap movements thereof.

3. A thermostatic device comprising an elongated bimetallic element of thermostatic material adapted to be subjected to heat, means cooperatively engaging said element at two separated points to impose longitudinal restraint upon the intervening portion thereof, at least one of the ends of said element extending freely beyond its corresponding point of restraint, said thermostatic element having its intervening portion normally curved in one direction until it is heated to a predetermined temperature when it abruptly snaps into a position having an opposite curvature, in which position it remains until cooled to a predetermined lower temperature when it abruptly snaps back to its original position of curvature, auxiliary means disposed in the path of movement of an extended free end of said thermostatic element and adapted to be engaged and actuated thereby during certain of its abrupt movements and means for passing controllable amounts of electric current through the intervening portion of said thermostatic element.

4. A thermostatic device comprising an elongated bimetallic element of thermostatic material adapted to be subjected to heat, means cooperatively engaging said element at two separated points to impose longitudinal restraint upon the intervening portion thereof, at least one of the ends of said element extending freely beyond its corresponding point of restraint, said thermostatic element having its intervening portion normally curved in one direction until it is heated to a predetermined temperature when it abruptly snaps into a position having an opposite curvature, in which position it remains until cooled to a predetermined lower temperature when it abruptly snaps back to its original position of curvature and a plurality of auxiliary means disposed in the path of movement of an extended free end of said thermostatic element and respectively adapted to be engaged and actuated thereby during the opposite abrupt movements thereof.

5. A thermostatic device comprising an elongated bimetallic element of thermostatic material adapted to be subjected to heat, means cooperatively engaging said element at two separated points to impose longitudinal restraint upon the intervening portion thereof, both of the ends of said element extending freely beyond its corresponding point of restraint, said thermostatic element having its intervening portion normally curved in one direction until it is heated to a predetermined temperature when it abruptly snaps into a position having an opposite curvature, in which position it remains until cooled to a predetermined lower temperature when it abruptly snaps back to its original position of curvature, and auxiliary means respectively in the path of movement of the respective free ends of said thermostatic element and adapted to be engaged and actuated by said ends during certain of the abrupt movements of said thermostatic element.

6. A thermostatic device comprising an elongated bimetallic element of thermostatic material adapted to be subjected to heat, means cooperatively engaging said element at two separated points to impose longitudinal restraint upon the intervening portion thereof, at least one of the ends of said element extending freely beyond its corresponding point of restraint, said thermostatic element having its intervening portion normally curved in one direction until it is heated to a predetermined temperature when it abruptly snaps into a position having an opposite curvature, in which position it remains until cooled to a predetermined lower temperature when it abruptly snaps back to its original position of curvature, a mercury switch having cooperative engagement with a free end of said thermostatic element and adapted to be actuated thereby during certain of the snap movements of said element.

7. A thermostatic device comprising an elongated bimetallic element of thermostatic material adapted to be subjected to heat, means cooperatively engaging said element at two separated points to impose longitudinal restraint upon the intervening portion thereof, at least one of the ends of said element extending freely beyond its corresponding point of restraint, said thermostatic element having its intervening portion normally curved in one direction until it is heated to a predetermined temperature when it abruptly snaps into a position having an opposite curvature, in which position it remains until cooled to a predetermined lower temperature when it abruptly snaps back to its original position of curvature, means for passing electric current through said intervening portion of said thermostatic element and control means responsive to the movements of the free end of said element for controlling the passage of current therethrough.

8. A thermostatic device comprising an elongated bimetallic element of thermostatic material adapted to be subjected to heat, means cooperatively engaging said element at two separated points to impose longitudinal restraint upon the intervening portion thereof, at least one of the ends of said element extending freely beyond its corresponding point of restraint, said thermostatic element having its intervening portion normally curved in one direction until it is heated to a predetermined temperature when it abruptly snaps into a position having an opposite curvature, in which position it remains until cooled to a predetermined lower temperature when it abruptly snaps back to its original position of curvature, an electrical circuit including an adjustable resistance and a control switch for passing electric current through said intervening portion of said thermostatic element, said electrical circuit being controlled by the movements of the free end of said thermostatic element in response to changes in temperature thereof.

9. A thermostatic device comprising a pair of spaced restraining members, an elongated strip of bimetallic thermostatic material adapted to be subjected to heat disposed between said restraining members and having edge engagement therewith, whereby the intervening portion of said thermostatic strip is longitudinally restrained, at least one end of said strip extending freely beyond one of said restraining members, said thermostatic strip having a normal curvature in one direction and being adapted to snap into a position of opposite curvature when heated to a predetermined temperature and to snap back to its original curvature when permitted to cool to another predetermined temperature, and means disposed in the path of movement of an extended free end of said strip and adapted to be engaged and actuated thereby during certain of its snap movements.

10. A thermostatic device comprising a fixed restraining member having an aperture therein, a pivotally mounted restraining member spaced therefrom and having an aperture therein, an elongated strip of bimetallic thermostatic material adapted to be subjected to heat and extending through the apertures in said restraining members and having edge engagement therewith, the respective end portions of said strip extending freely beyond the respective restraining members, said thermostatic strip being normally adapted to occupy a position of curvature in one direction but to abruptly reverse its curvature under predetermined temperature conditions and subsequently to abruptly return to its original position of curvature when permitted to cool to another predetermined temperature, and yielding means cooperating with said pivotally mounted restraining member for adjusting the degree of longitudinal restraint placed upon the intervening portion of said thermostatic strip.

RICHARD VARLEY.